(12) United States Patent
Nicot et al.

(10) Patent No.: US 6,456,913 B1
(45) Date of Patent: Sep. 24, 2002

(54) STEERING COLUMN WITH HALL LINEAR ARRAY

(75) Inventors: Christophe Nicot, Epagny; Pascal Desbiolles, Thorens-Glieres; Fernand Peilloud, Alby sur Cheran, all of (FR)

(73) Assignee: S.N.R. Roulements, Annecy Cedex (FR)

( * ) Notice: Subject to any disclaimer, the term of this patent is extended or adjusted under 35 U.S.C. 154(b) by 0 days.

(21) Appl. No.: 09/747,719

(22) Filed: Dec. 22, 2000

(51) Int. Cl.[7] ................................................ G01L 3/10
(52) U.S. Cl. ........................ 701/41; 701/42; 73/862.333
(58) Field of Search ................. 701/41, 42; 73/862.333, 73/862.335, 862.325

(56) References Cited

U.S. PATENT DOCUMENTS

| | | | | |
|---|---|---|---|---|
| 4,989,460 A | * | 2/1991 | Mizuno et al. | 73/862.36 |
| 5,442,956 A | * | 8/1995 | Persson | 73/118.1 |
| 5,465,627 A | * | 11/1995 | Garshelis | 73/862.335 |
| 5,520,059 A | * | 5/1996 | Garshelis | 73/862.335 |
| 5,825,178 A | * | 10/1998 | Hipp et al. | 324/207.2 |
| 5,982,067 A | * | 11/1999 | Sebastian et al. | 310/184 |
| 6,098,468 A | * | 8/2000 | Mohri et al. | 73/862.333 |
| 6,198,397 B1 | * | 3/2001 | Anger et al. | 340/576 |
| 6,237,428 B1 | * | 5/2001 | Odachi et al. | 73/862.333 |
| 6,295,879 B1 | * | 10/2001 | Miller et al. | 73/862.08 |
| 6,301,976 B1 | * | 10/2001 | Bogdanov | 73/862.333 |

* cited by examiner

*Primary Examiner*—Tan Nguyen
(74) *Attorney, Agent, or Firm*—Perman & Green, LLP

(57) ABSTRACT

The invention relates to a vehicle steering column having a manual control apparatus for applying a torque to the transmission shaft of the column, said column being provided with means of measuring the torque applied to said transmission shaft, the means of measuring the applied torque comprising a means generating magnetic pulses and a device for detecting these pulses, in which the detection device comprises a plurality of aligned sensitive elements.

18 Claims, 4 Drawing Sheets

$$SIN = (S1 - S2) - (S1' - S2')$$
$$COS = (S1 + S2) - (S1' + S2')$$

STEERING COLUMN WITH HALL LINEAR ARRAY

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The invention relates to the technical field of vehicle steering columns.

2. Description of the Related Art Including Information Disclosed Under 37 CFR 1.97 AND 1.98;

Steering column conventionally designates a tubular element, fixed to the body of the vehicle, under the dashboard, which guides and supports the transmission shaft connected to the steering wheel.

This steering wheel is then a manual control apparatus, connected to the steered wheels and used by the driver to steer the vehicle.

The invention also concerns decoupled steering columns. Unlike conventional steering columns, decoupled steering columns are not associated with a steering box converting the circular movement of the steering wheel into angular displacement of the steering arm which causes wheel turning.

On the contrary, for these instances of decoupled steering, there is no direct mechanical connection between the steering wheel and the wheels resting on the ground, whether the vehicle is real or belongs to a simulation system.

This simulation can be a play object, connected with training in driving schools, or connected with interactive driving simulation for the requirements of motor vehicle manufacturers.

In such simulators, the reconstruction of forces at the steering wheel by means of a mechanism generating a resistive torque on the steering wheel as a function of the vehicle type to be simulated, equipped or not with power steering, must take into account the driving conditions to be recreated.

Measurement of the torque applied to the steering wheel is consequently essential for providing a good simulation, in real time.

Measurement of torque on the steering wheel shaft is also very important in servo steering or power steering.

This is because the level of assistance depends notably on the torque applied by the driver on the steering wheel.

The torquemeter, or torque sensor, used in servo steering gives out a signal indicative of the turning torque exerted by the driver on the steering wheel and therefore on the transmission shaft of the vehicle steering column.

This signal is conventionally sent to a steering assistance computer which controls the assistance, by controlling for example an electric motor, in the case of electric servo steering.

The invention relates more particularly, but not exclusively, to steering columns having a magnetic pulse generator referred to as a "coder" and a functionally associated detection device referred to as a "sensor" of magnetoresistance or Hall effect probe type.

Here, "Hall effect probe" designates sensors comprising at least one sensitive element, generally a semiconductor in wafer form, such that, when a current I passes through it, being furthermore subjected to an induction B making an angle $\theta$ with the current, there appears, in a direction perpendicular to the current I and to the induction B, a voltage V having the value V=K.I.B. sin $\theta$, K being referred to as the "Hall constant", and being characteristic of the material and geometry of the sensitive element, K varying with temperature.

Here, "magnetoresistance" designates a varistor sensitive to the intensity of a magnetic field, in other words a resistance made of semiconductor material whose ohmic value varies with variation in the intensity of a unidirectional magnetic field applied perpendicular to the direction of the current passing through the resistance.

Hall probes are considered as active sensors, since the information delivered is connected with an electromotive force.

When these Hall probes are used for the translation of movement, the magnet which creates the induction is associated with the sensing body acted on by the primary value to be measured, modifying the secondary measurand, namely conventionally the normal component of the induction, the measurand to which the probe is directly sensitive.

Devices are known for measuring the torque exerted on a shaft comprising a sensor, for example a Hall effect sensor, positioned at air gap distance from a magnetic pattern with a rapid transition, so that the sensor measures the variation in magnetic induction of the coder and, by means of an electronic circuit, the torque exerted is then deduced therefrom.

For example, in such devices, the coder is immovably attached to a part of the steering column which, under the action of the exerted torque, moves with respect to a substantially non-stressed part with which the sensor is associated.

Such devices have the following drawbacks:

the sensitivity of the sensor can vary as a function of the temperature. This is because it takes into account the drift of the sensor and the magnets. Certain correction principles consist of using a Hall effect sensor partially compensating for the temperature drift of the magnets or appropriate processing electronics. This principle has limited performance in view of the random sensitivity and offset drifts of the sensors;

a magnetic shielding device must be used in order to be free from any external magnetic perturbation;

the sensitive elements must be skilfully positioned opposite the magnetic transition in order to minimize the magnetic offset, and the drift of the zero with regard to temperature which results therefrom.

The invention relates to a steering column provided with means of measuring the torque based on electromagnetic phenomena which does not have the drawbacks of the devices of the prior art.

BRIEF SUMMARY OF THE INVENTION

To that end, the invention proposes a vehicle steering column having a manual control apparatus for applying a torque to the transmission shaft of the column, said column being provided with means of measuring the torque applied to said transmission shaft, the means of measuring the applied torque comprising a means generating magnetic pulses and a device for detecting these pulses, in which the detection device comprises a plurality of aligned sensitive elements chosen from amongst the group comprising Hall effect probes, magnetoresistances, and giant magnetoresistances, the sensitive elements being placed equidistant from one another.

The magnetic pulse generating means comprises a number of pairs of magnetic poles with reverse direction of magnetization of a given pole with respect to those contiguous with it, capable of providing, at the air gap under consideration, a sinusoidal magnetic field over the whole measurement area. For example, the number of pairs of magnetic poles is equal to at least two.

The detection device detects the relative movement between the sensitive elements and the magnetic pulse generating means.

In a first embodiment, the detection device comprises an even number 2N of sensitive elements. The even number of sensitive elements can be selected by programming of EEPROM, ZENER ZAPPING or equivalent type.

The set of 2N sensitive elements is divided into two subsets of N elements, each sensitive element of the first subset being connected to a first adder, each sensitive element of the second subset being connected to a second adder, the output $S_1$ issuing from the first adder and the output $S_2$ issuing from the second adder, via an inverter, are connected to the input of a third adder, and the signal $COS=S_1-S_2$ thus obtained is processed by a circuit, so as to deduce the torque exerted on the steering column.

In another embodiment, the detection device comprises a number of sensitive elements which is a multiple of four.

The set of 4P sensitive elements is divided into four subsets of P elements, each sensitive element of the first P-element subset being connected to a first adder supplying a signal $S_1$;

each sensitive element of the second P-element subset being connected to a second adder supplying a signal $S_2$;

each sensitive element of the third P-element subset being connected to a third adder supplying a signal $S'_1$;

each sensitive element of the fourth P-element subset being connected to a fourth adder supplying a signal $S'_2$;

a circuit of adders and inverters supplying two signals SIN and COS respectively having the values:

$$SIN=(S_1-S_2)-(S'_1-S'_2);$$
$$COS=(S_1-S_2)-(S'_1+S'_2);$$

these signals SIN and COS being connected to a fifth adder, the signal SCOUPLE=SIN+COS thus obtained being processed by a circuit, so as to deduce the torque exerted on the steering column.

A programmable gain G is possibly applied to the signal COS and/or the signal SIN before being connected to the fifth adder, the gain G being programmed so as to obtain a zero signal SCOUPLE when the torque applied to the column is zero.

In a supplementary embodiment, the signals issuing from each sensitive element are connected to a maximum intensity detector which, via a regulator and a control device, controls the sensitivity of the sensitive elements, so as to obtain a detection of the torque exerted on the steering column substantially independent of temperature.

In a variant, the sensitive elements are integrated on an ASIC type circuit support and the detection device can also be included in an ASIC type customized integrated circuit.

The magnetic pulse generating means are immovably attached to a part of the steering column which is deformed under the action of the exerted torque and the detection device is immovably attached to a substantially non-stressed part of the steering column.

Other objects and advantages of the invention will emerge in the course of the following description of one embodiment, said description being produced with reference to the accompanying drawings in which:

BRIEF DESCRIPTION OF THE SEVERAL VIEWS OF THE DRAWING(S)

DETAILED DESCRIPTION OF THE INVENTION

A steering column provided with means of measuring the applied torque comprises a transmission shaft, a means generating magnetic pulses referred to as a "coder" and a device for detecting these pulses referred to as a "sensor".

In one embodiment, the transmission shaft is interrupted by a sensing body operating under flexion. The coder is associated with a part of the sensing body stressed by the exerted torque and the sensor is associated, at air gap distance from the coder, with a substantially non-stressed part of the sensing body. The result of the exerted torque is that the coder moves in front of the sensor, said movement being a function of the torque exerted on the steering column.

Figure 1:
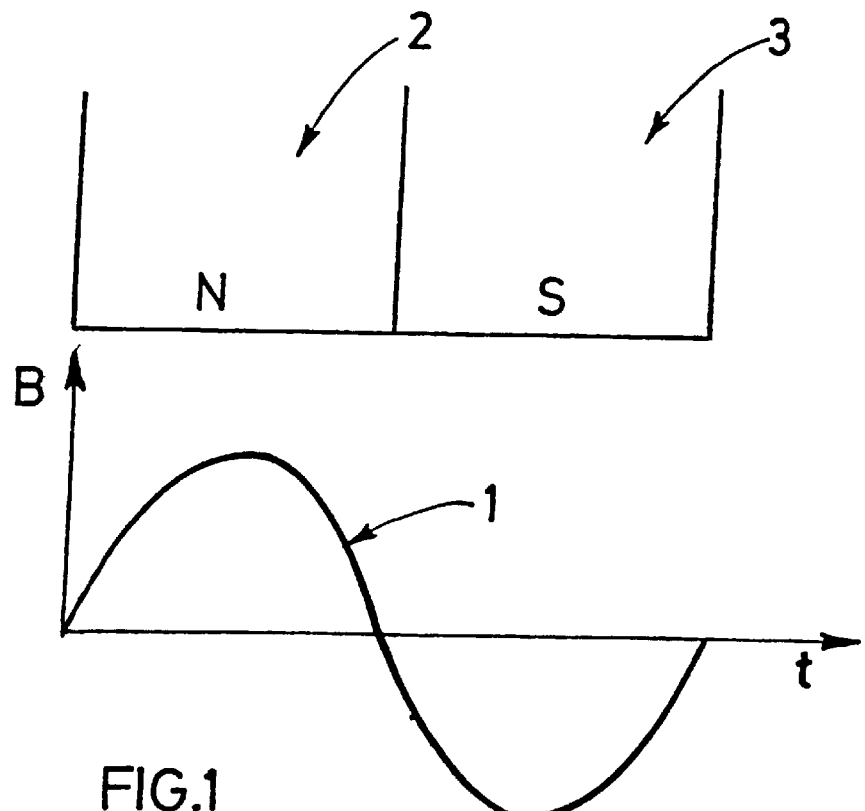
FIG. 1 is a partial schematic representation of a pair of poles of a coder and of the substantially sinusoidal magnetic induction at the working air gap which it delivers.

FIG. 1 illustrates schematically one period 1 of a component, for example a normal one, of said induction B, for a pair of poles 2, 3 of the coder.

The detection device 4 comprises an even number 2N of sensitive elements 5 of magnetoresistance or Hall effect probe type, placed at equal distance d from one another, these elements 5 being substantially disposed along a straight line D, for example the sensitive elements 5 can be disposed on an arc of a circle which can be approximated to a straight line.

In the embodiments depicted, twenty-four sensitive elements 5 are provided.

This arrangement defines a linear array 6 of sensitive elements 5 of length (2N−1)d.

The detection device also comprises an electronic circuit 7 making it possible to process the analogue signals issuing from the different sensitive elements 5 in order to obtain information such as, for example, the angular position of a multipolar magnetic part placed facing the linear array 6.

The detection device can be integrated on a substrate made of silicon or equivalent, for example GaAs, so as to form a customized integrated circuit for a specific application, said circuit sometimes being designated by the term ASIC for referring to the integrated circuit designed partially or completely according to requirements.

When the multipolar magnetic part comprises two pairs of magnetic poles with reverse direction of magnetization of a given pole with respect to those contiguous with it, the magnetic induction at the air gap can be likened to a sinusoidal form over the whole measurement area and therefore has no deformation due to edge effects. This is because the presence of two additional poles makes it possible to push back the edge effects outside the measurement area. The magnetic period of the field is then defined as the period of the sinusoidal wave delivered at the air gap.

In the embodiments depicted, the linear array 6 of sensitive elements 5 covers one complete magnetic period.

In a variant, when the linear array 6 of sensitive elements 5 detects more than one magnetic period, the length of the linear array 6 of sensitive elements 5 can be reduced to 2M elements used out of the 2N (M being less than N), by programming, for example of EEPROM or ZENER ZAPPING type.

Here, EEPROM designates an electrically erasable reprogrammable memory, each cell of which is for example formed from an MNOS or DIFMOS or equivalent transistor, with read and write transistors, the MNOS (Metal Nitride Oxide Semiconductor) transistors, derivatives of MOS transistors, forming a semiconductor memory.

Zener Zapping conventionally designates Zener adjustment, that is to say a correction of any error in voltage supplied by a de-digitizer for a given binary input word, by selective short-circuiting of reverse-biased Zener diodes supplied by constant current sources of increasing intensity, the total intensity of the circuit thus obtained creating the necessary correction voltage at the terminals of a resistor.

Figure 2:
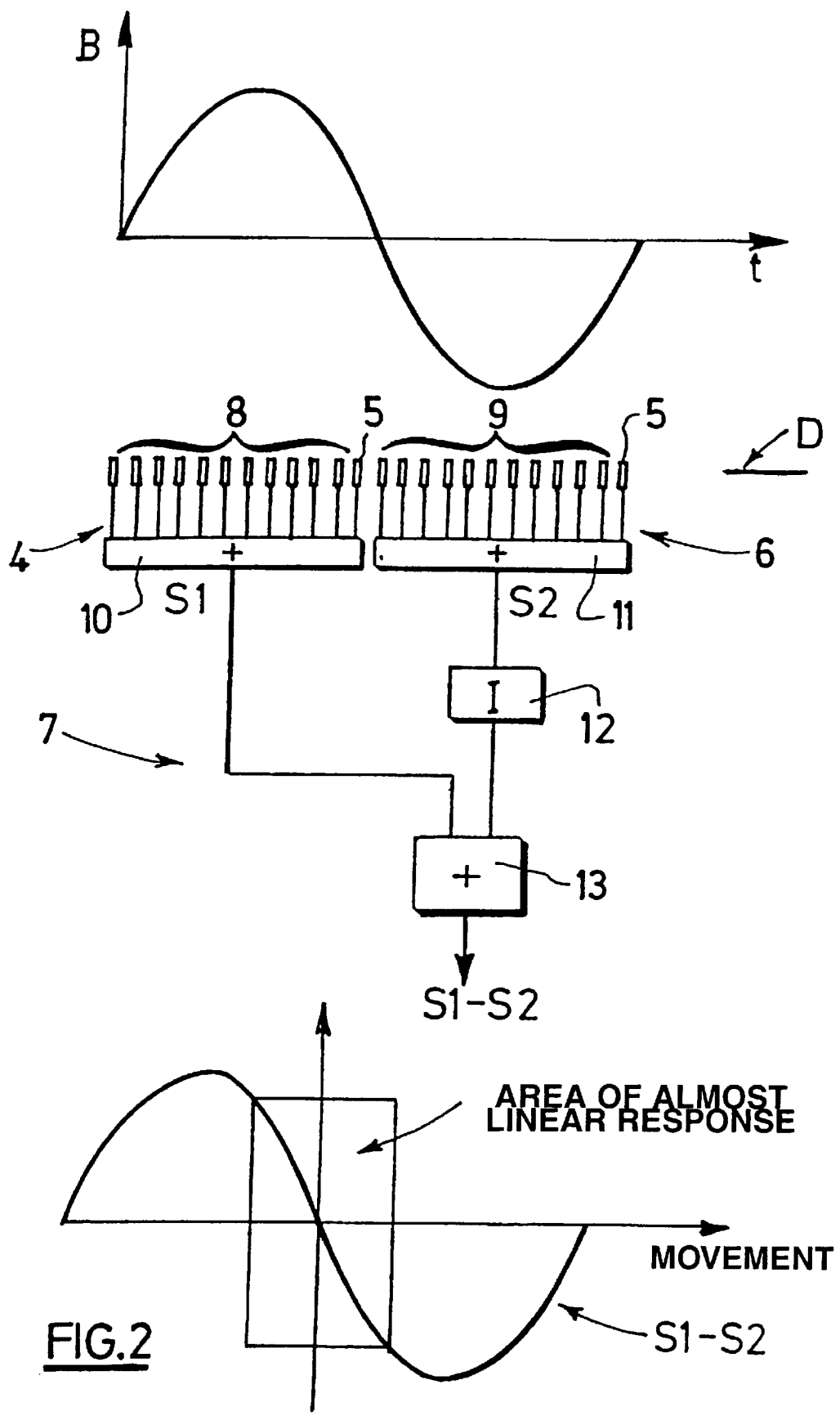
FIG. 2 depicts one embodiment of the detection device according to the invention.

In the embodiment of FIG. 2, the set of sensitive elements 5 is divided into two subsets 8, 9 of N elements.

Each sensitive element 5 of the first subset 8 is connected to a first adder or addition circuit 10, such as an amplifier, summing the signals $Se_1, Se_2, \ldots, Se_N$, issuing from the first N sensitive elements 5.

Similarly, each sensitive element 5 of the second subset 9 is connected to a second adder or addition circuit 11, such as an amplifier, summing the signals $Se_{(N+1)}, Se_{(N+2)}, Se_{(N+3)}, \ldots, Se_{2N}$, issuing from the other N sensitive elements 5.

The following two sum signals are thus obtained:

$$S_1 = Se_1 + \ldots + Se_N$$

$$S_2 = Se_{(N+1)} + \ldots + Se_{2N}.$$

The output $S_1$ of the first adding means and, via an inverter 12, the output $S_2$ of the second adding means are connected to the input of a third adding means or addition circuit 13.

In this first embodiment, the linear array 6 of sensitive elements 5 is positioned, under zero torque, opposite the magnetic part and properly centred on the magnetic transition so that the signal phase shift connected with poor mechanical positioning is zero. The signals are then:

$$Se_1 = \sin(wt - \alpha/2)$$

$$Se_2 = \ldots$$

$$\ldots$$

$$Se_{(2N-1)} = \ldots$$

$$Se_{2N} = \sin(wt - (\tfrac{1}{2} + 2N - 1)\alpha)$$

where $\alpha$ corresponds to the phase shift between two sensitive elements 5 ($\alpha = \pi/2N \cdot Lp0/Lp$) with $Lp0 = 2Nd$ and $Lp$ is the polar length of the sensor which is defined as the length of a magnetic pole measured at the read radius under consideration.

At the output of the third adding means 13 there then appears a sinusoidal signal:

$S_1 - S_2$ (subsequently referred to as "COS").

The variation in the delivered signal $S_1 - S_2$ as a function of the movement of the magnetic part in front of the linear array 6 of sensitive elements 5 is then sinusoidal centred on zero (see FIG. 2).

By choosing a rigidity of the sensing body operating under flexion appropriate to the torque measurement range, an almost linear output as a function of the torque exerted on the steering column can thus be obtained (see FIG. 2).

The magnetic offset corresponds to a D.C. component which is added to the detected signals $S_1$ and $S_2$. However, the magnetic offset or the external magnetic perturbations being assumed uniform over all the sensitive elements 5, the subtraction $S_1 - S_2$ does not have any D.C. component related to the magnetic offset.

In a variant (not depicted) of this embodiment, the output $S_1$ of the first adding means 10 and the output $S_2$ of the second adding means 11 are connected to an additional adding means so as to form the signal $SIN = S_1 + S_2$.

A means of being free from precise positioning of the linear array 6 of sensitive elements 5 opposite the magnetic part is then to form a linear combination of the signals SIN and COS by amplifying one of these two signals using a programmable gain G. This approach is described in detail below in connection with the second embodiment.

However the signal, a function of the exerted torque, thus obtained is not free from magnetic offset of the coder nor external perturbations since the signal SIN is obtained by summation of $S_1$ and $S_2$.

Figure 3:
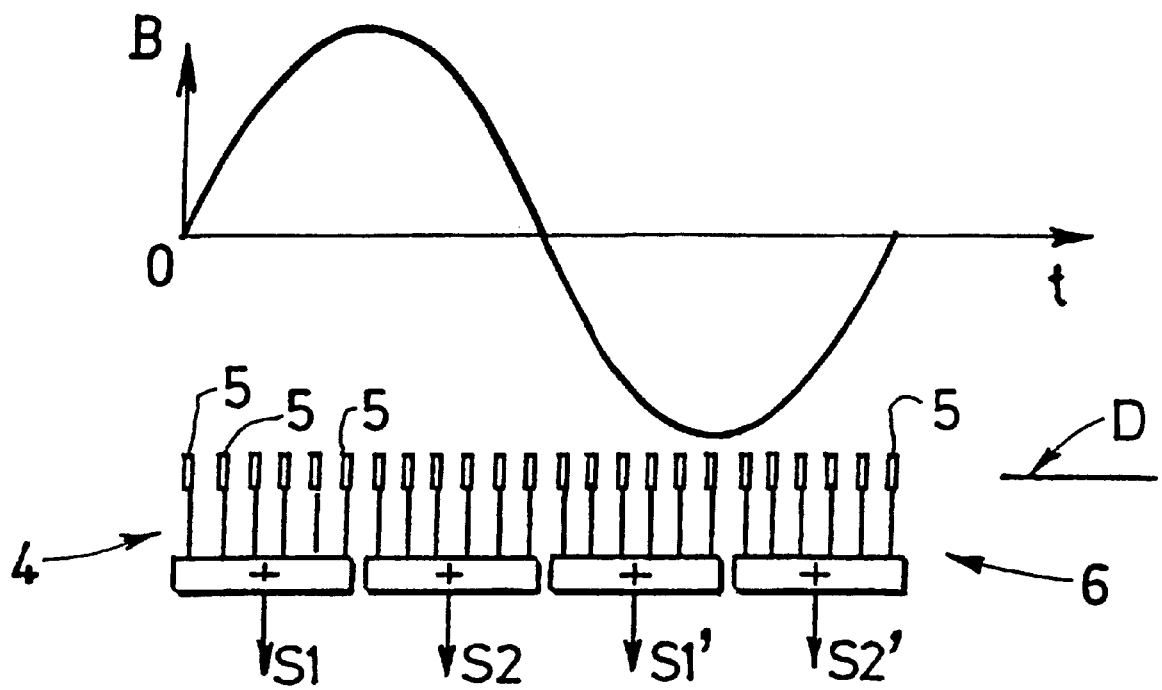
FIG. 3 depicts a second embodiment of the detection device according to the invention.
Figure 3:
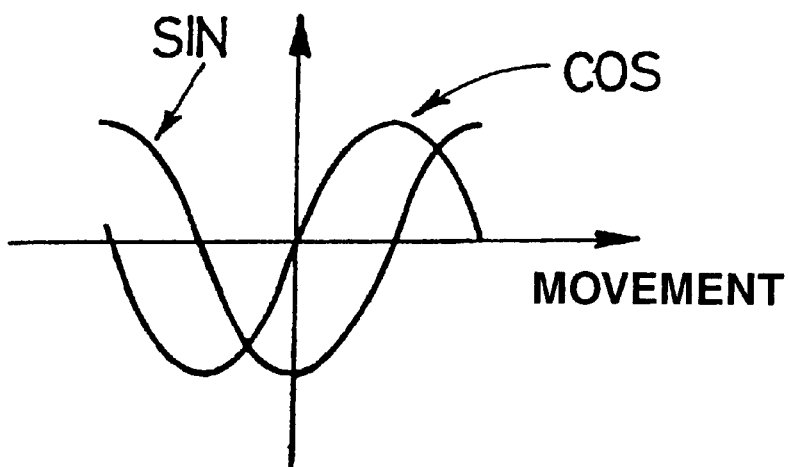

The second embodiment depicted in FIG. 3 makes it possible to be free from precise positioning of the linear array 6 of sensitive elements 5 opposite the magnetic part while using a signal, a function of the exerted torque, which is free from magnetic offset.

The linear array 6 of sensitive elements 5 is broken down into four P-sensing-element quadrants and an electronic circuit based on summing amplifiers makes it possible to obtain the signals $S_1$, $S_2$, $S'_1$ and $S'_2$ issuing respectively from the first, second, third and fourth P-sensing-element subsets of a 4P-sensing-element linear array.

The analogue signals formed using an electronic circuit, for example based on summing amplifiers and inverters, are then as follows:

$$SIN = (S_1 - S_2) - (S'_1 - S'_2),$$

and $$COS = (S_1 + S_2) - (S'_1 + S'_2).$$

The expression of the signals SIN and COS is as follows:

$$SIN = -4\frac{\sin(\pi/8 \cdot Lp0/Lp) \cdot \sin(\pi 4 \cdot Lp0/Lp)}{\sin(\pi/2/Lp \cdot Lp0/4P)} \sin(wt - \pi Lp0/Lp)$$

$$COS = \frac{2\sin^2(\pi/4 \cdot Lp0/Lp)}{\sin(\pi/2/Lp \cdot Lp0/4P)} \cdot \cos(wt - \pi Lp0/Lp)$$

The detection device described in this embodiment delivers two sinusoidal signals SIN and COS in full quadrature, independently of the positioning of the sensor in front of the coder. These signals are also free from magnetic offset since they are obtained by quadrant subtraction.

By choosing a rigidity of the sensing body operating under flexion appropriate to the torque measurement range, there can thus be obtained, with the signal SIN or with the signal COS or with a combination of the two, an almost linear output as a function of the torque exerted on the steering column.

The vectorial representation of the change in these two signals as a function of the torque exerted and/or the poor positioning of the sensor in front of the coder is given in FIGS. 4a to 4e.

In these figures, the detection axis corresponds to the axis Ox and the measurement corresponds to the vector projection on this axis.

Figure 4A:
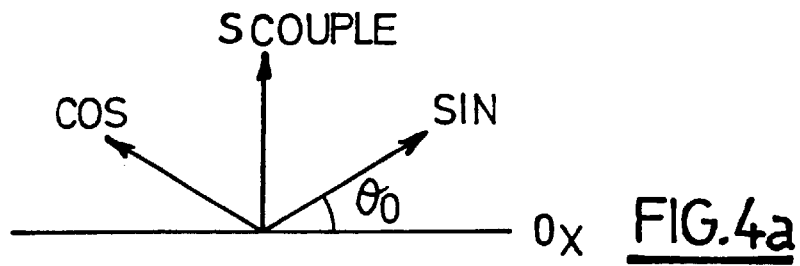
FIGS. 4a to 4e depict a vectorial representation of the change in the signals delivered as a function of the torque exerted and/or the poor positioning of the sensor in front of the coder.
Figure 4B:
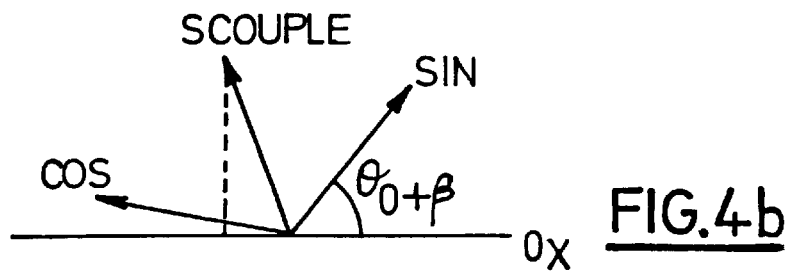
Figure 4C:
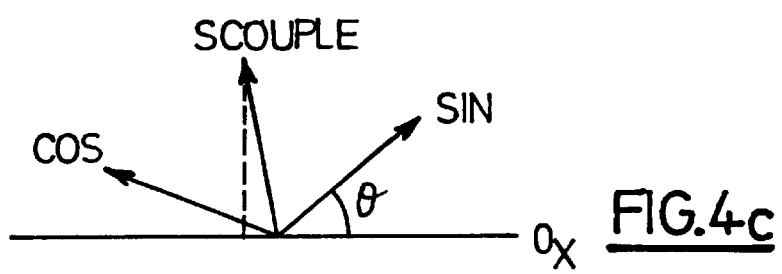

FIGS. 4a and 4b correspond to the case where the linear array 6 of sensitive elements 5 was positioned, under zero torque, opposite the sensor.

Under zero torque, the component along the detection axis of the signal SCOUPLE=SIN+COS is zero (see FIG. 4a). The angle of rest $\theta_0$ measured between the axis Ox and the vectorial representation of the signal SIN is then equal to 45°.

When a torque is applied to the steering column, the coder then moves relative to the sensor which results in the vectorial representation of the signals SIN and COS turning by an angle $\beta$ (see FIG. 4b). The component along the detection axis of the signal SCOUPLE is then no longer zero and is a function of the torque exerted on the steering column.

In the case of poor positioning of the sensor opposite the coder, the vectorial representation of the signals SIN and COS at the angle of rest $\theta_0$ is equal to a value $\theta$ different from 45° which corresponds to this poor positioning. It then turns out that the component along the detection axis of the signal SCOUPLE is no longer zero under zero torque (see FIG. 4c). This situation corresponds to an offset of the zero of the sensor.

A means of being free from this problem is to amplify the signal SIN and/or the signal COS using a programmable gain G, and then to produce, using an adding means, the sum of these amplified signals.

For example, where only the signal COS is amplified, the signal used for measuring the exerted torque is then SCOUPLE=SIN+G.COS.

Figure 4D:
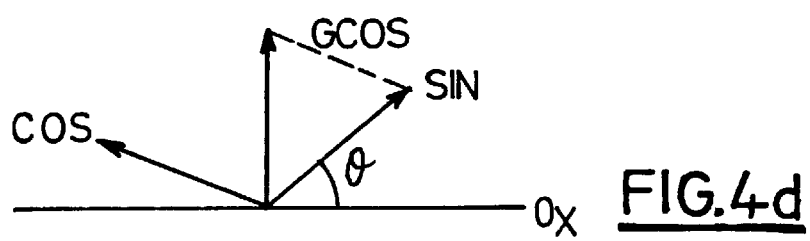

The gain G is programmed as a function of the angle $\theta$, under zero torque, so that the component along the detection axis of the signal SCOUPLE is zero (see FIG. 4d).

Figure 4E:
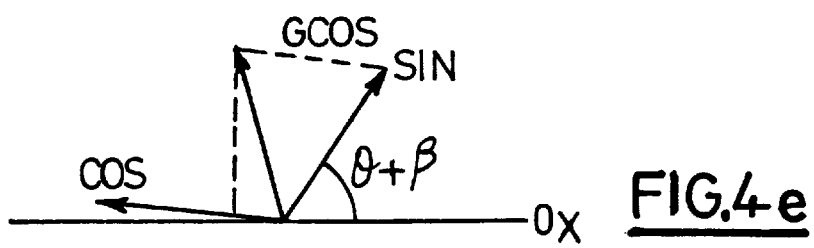

When a torque is applied to the steering column, the coder then moves relative to the sensor which results in the vectorial representation of the signals SIN and COS turning by an angle $\beta$ (see FIG. 4e). The component along the detection axis of the signal SCOUPLE is then no longer zero and is a function of the torque exerted on the steering column.

The zero can then be adjusted by roughly positioning, for example around a position corresponding to an electrical angle of 45°, the linear array 6 of sensitive elements 5 opposite the magnetic part and then adjusting the gain G by programming in order that the detected component of the signal SCOUPLE=SIN+G.COS is zero under zero torque.

In a variant of the two embodiments described above, the torque sensor associated with the steering column supplies an analogue signal independent of temperature.

In fact, when the temperature changes, the amplitude of the field delivered by the coder varies by 20% for every 100° C. in the case of ferrite, and consequently the sensitivity of the sensor is modified.

Figure 5:
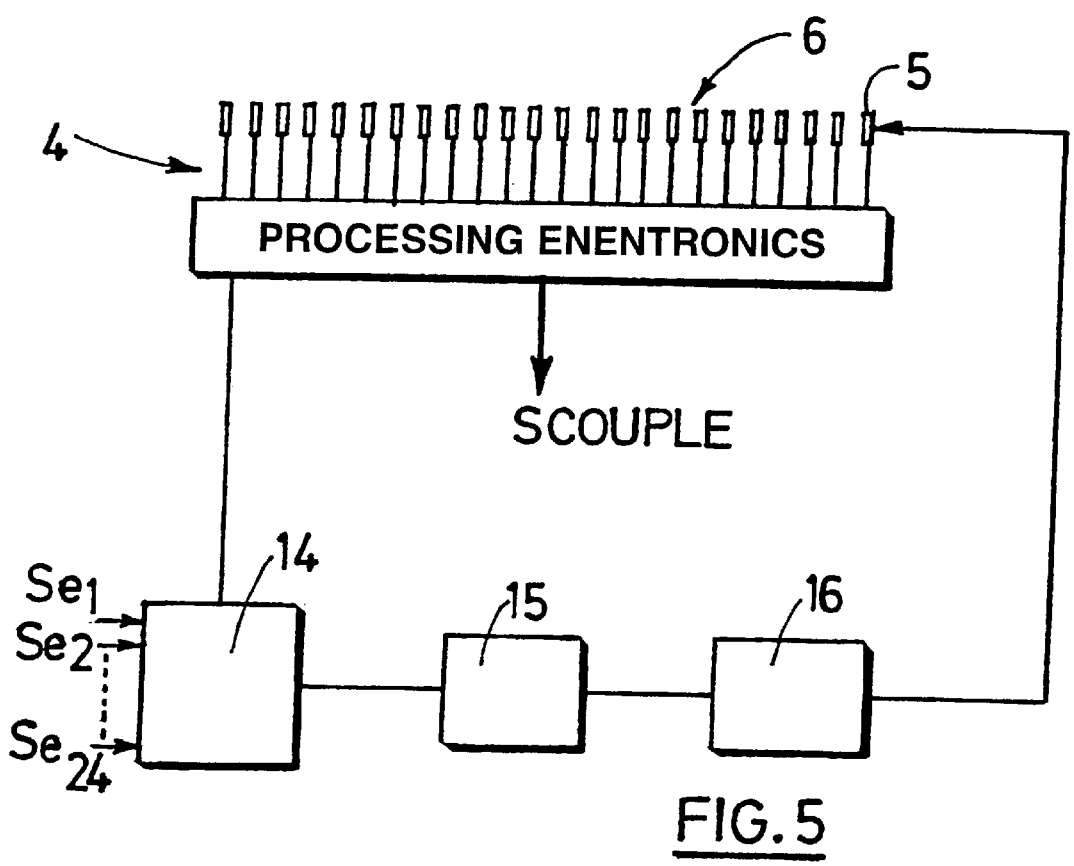
FIG. 5 depicts a device making it possible to be free from the effect of temperature and air gap variations on the analogue signals supplied.

So as to be free from these temperature drifts, the signals issuing from each sensitive element 5 are connected to a detection means 14 which makes it possible to select the maximum signal (see FIG. 5). The maximum of the magnetic fields is known with an accuracy which is a function of the inter-element distance d. Moreover, whatever the position of the sensor opposite the coder, there is always a sensitive element 5 capable of delivering the maximum magnetic field.

The amplitude of the magnetic field read by the linear array 6 is then regulated using a loop for regulating the current injected into the sensitive elements 5, comprising for example a regulator 15 and a means of controlling 16 the injected current. The signals delivered by each of the sensitive elements 5 then correspond to a portion of sinusoid whose amplitude is maintained at the constant known set point value.

The output signal of the sensor is then a sinusoidal signal whose amplitude is constant and therefore insensitive to temperature.

In more general terms, the device described above makes it possible to obtain, at the output of the sensor, a signal independent of air gap variations.

What is claimed is:

1. A vehicle steering column having a manual control apparatus for applying a torque to the transmission shaft of the column, said column being provided with means of measuring the torque applied to said transmission shaft, the means of measuring the applied torque comprising a means generating magnetic pulses and a device for detecting these pulses, wherein the detection device comprises a plurality of aligned sensitive elements each of the sensitive elements being able to deliver an analogue signal corresponding to the detected magnetic field, said detection device further comprising an electronic circuit making it possible to process said analogue signals.

2. A vehicle steering column according to claim 1, characterised in that the aligned sensitive elements are chosen from amongst the group comprising Hall effect probes, magnetoresistances, and giant magnetoresistances.

3. A vehicle steering column according to claim 1, characterised in that the sensitive elements are placed equidistant from one another.

4. A vehicle steering column according to claim 1, characterised in that the magnetic pulse generating means comprises a number of pairs of magnetic poles with reverse direction of magnetization of a given pole with respect to those contiguous with it, capable of providing, at the air gap under consideration, a sinusoidal magnetic field over the whole measurement area.

5. A vehicle steering column according to claim 4, characterised in that the number of pairs of magnetic poles is equal to at least two.

6. A vehicle steering column according to claim 1, characterised in that the detection device detects the relative movement between the sensitive elements and the magnetic pulse generating means.

7. A vehicle steering column according to claim 1, characterised in that the detection device comprises an even number 2N of sensitive elements.

8. A vehicle steering column according to claim 7, characterised in that the even number of sensitive elements is selected by programming of EEPROM, ZENER ZAPPING or equivalent type.

9. A vehicle steering column according to claim 7, characterised in that the set of 2N sensitive elements is divided into two subsets of N elements, each sensitive element of the first subset being connected to a first adder, each sensitive element of the second subset being connected to a second adder, the output $S_1$ issuing from the first adder and the output $S_2$ issuing from the second adder, via an inverter, are connected to the input of a third adder, and the signal $COS=S_1-S_2$ thus obtained is processed by a circuit, so as to deduce the torque exerted on the steering column.

10. A vehicle steering column according to claim 1, characterised in that the detection device comprises a number of sensitive elements which is a multiple of four.

11. A vehicle steering column according to claim 10, characterised in that the set of 4P sensitive elements is divided into four subsets of P elements, each sensitive element of the first P-element subset being connected to a first adder supplying a signal $S_1$;

each sensitive element of the second P-element subset being connected to a second adder supplying a signal $S_2$;

each sensitive element of the third P-element subset being connected to a third adder supplying a signal $S'_1$;

each sensitive element of the fourth P-element subset being connected to a fourth adder supplying a signal $S'_2$;

a circuit of adders and inverters supplying two signals SIN and COS respectively having the values:

$$SIN=(S_1-S_2)-(S'_1-S'_2);$$

$$COS=(S_1-S_2)-(S'_1+S'_2);$$

these signals SIN and COS being connected to a fifth adder, the signal SCOUPLE=SIN+COS thus obtained being processed by a circuit, so as to deduce the torque exerted on the steering column.

12. A vehicle steering column according to claim 11, characterised in that a programmable gain G is applied to the signal COS and/or the signal SIN before being connected to the fifth adder.

13. A vehicle steering column according to claim 12, characterised in that the gain G is programmed so as to obtain a zero signal SCOUPLE when the torque applied to the column is zero.

14. A steering column according to claim 1, characterised in that the signals issuing from each sensitive element are connected to a maximum intensity detector which, via a regulator and a control device, controls the sensitivity of the sensitive elements, so as to obtain a detection of the torque exerted on the steering column substantially independent of temperature.

15. A vehicle steering column according to claim 1, characterised in that the sensitive elements are integrated on an ASIC type circuit support.

16. A vehicle steering column according to claim 15, characterised in that the detection device is included in an ASIC type customized integrated circuit.

17. A vehicle steering column according to claim 1, characterised in that the magnetic pulse generating means are immovably attached to a part of the steering column which is deformed under the action of the exerted torque.

18. A vehicle steering column according to claim 17, characterised in that the detection device is immovably attached to a substantially non-stressed part of the steering column.

* * * * *